United States Patent [19]

Fujinawa et al.

[11] Patent Number: 5,285,730
[45] Date of Patent: Feb. 15, 1994

[54] BODY STRUCTURE FOR RAILWAY VEHICLE

[75] Inventors: Takashi Fujinawa; Isamu Kawanishi; Hiroaki Kohira; Kazuya Inoue, all of Hyogo, Japan

[73] Assignee: Kawasaki Jukogyo Kabushiki Kaisha, Kobe, Japan

[21] Appl. No.: 761,186

[22] Filed: Sep. 17, 1991

[30] Foreign Application Priority Data

Sep. 18, 1990 [JP] Japan .................. 2-246085
Sep. 20, 1990 [JP] Japan .................. 2-99099[U]

[51] Int. Cl.⁵ ............................................ B61D 17/00
[52] U.S. Cl. ............................. 105/401; 105/400; 105/423
[58] Field of Search ............... 105/397, 396, 401, 400, 105/399, 404, 409, 407; 52/53, 732, 630, 795, 807, 813; 296/181, 183, 191

[56] References Cited

U.S. PATENT DOCUMENTS

| 1,172,095 | 2/1916 | Worth et al. | 105/409 |
| 1,224,050 | 4/1917 | Worth et al. | 105/409 |
| 1,273,564 | 7/1918 | Worth | 105/409 |
| 1,485,329 | 2/1924 | Campbell | 105/409 |
| 2,164,646 | 7/1939 | Edahl | 105/409 |
| 2,314,979 | 3/1943 | Gunn | 105/401 |
| 4,076,166 | 2/1978 | Austill | 52/53 |

FOREIGN PATENT DOCUMENTS

| 0596791 | 10/1925 | France | 105/399 |
| 0075272 | 6/1981 | Japan | 296/191 |
| 220962 | 10/1986 | Japan | 105/397 |
| 220146 | 6/1968 | U.S.S.R. | 105/407 |

Primary Examiner—Mark T. Le
Attorney, Agent, or Firm—Schwartz & Weinrieb

[57] ABSTRACT

A side body structure for vehicles is formed of a plurality of sections. Each of the sections has a reinforcement formed as an integrally continuous construction. The reinforcement has a plurality of through holes which reduce the total weight of the reinforcement. The reinforcement further includes a plurality of ribs formed around the holes and is securely fastened together to a surface of an outer plate.

8 Claims, 19 Drawing Sheets

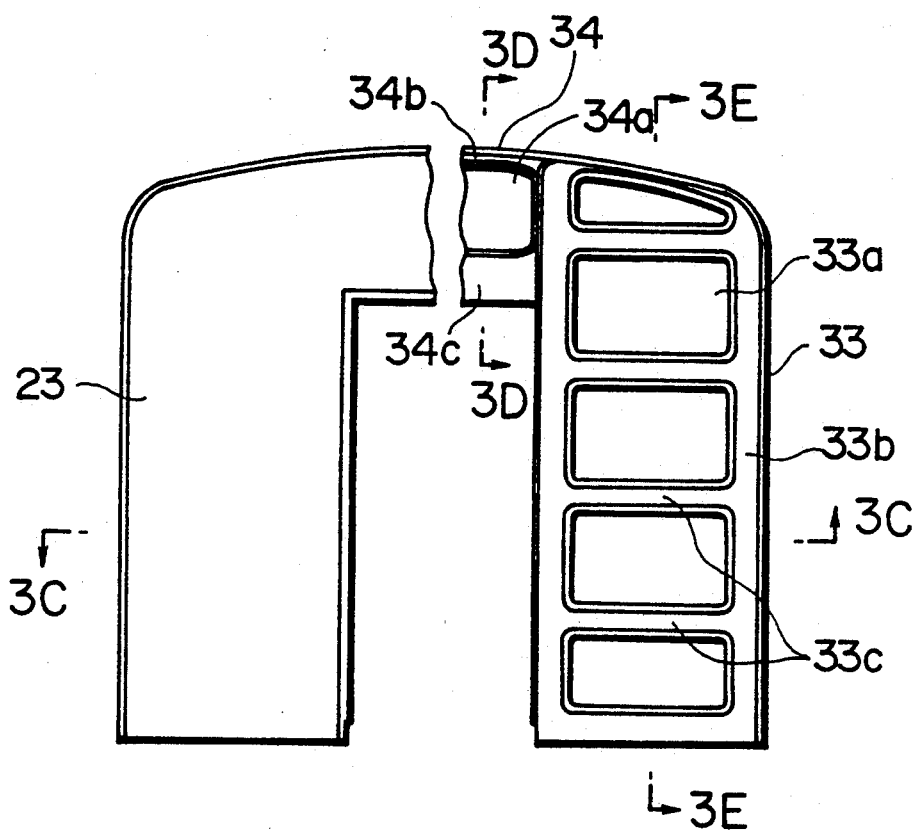

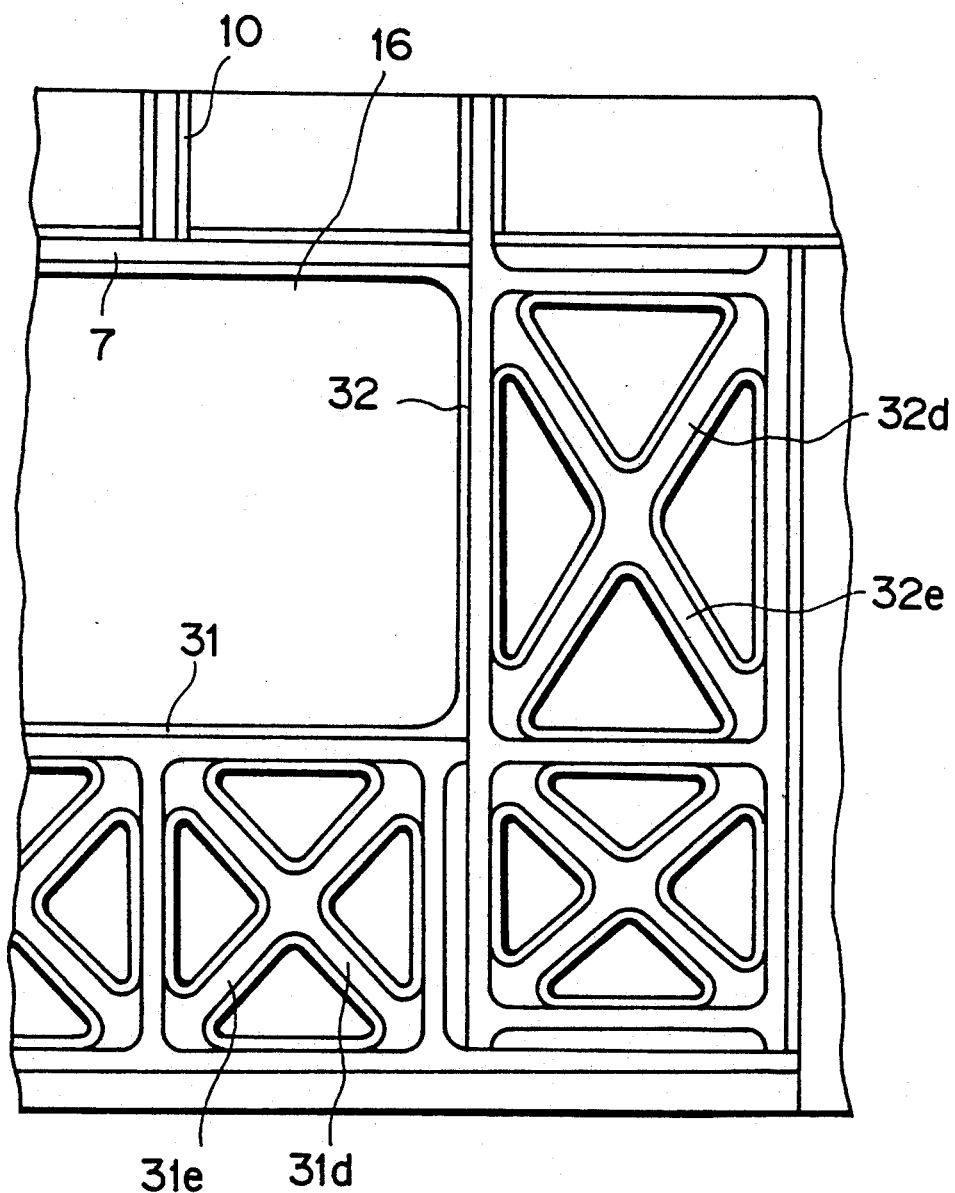

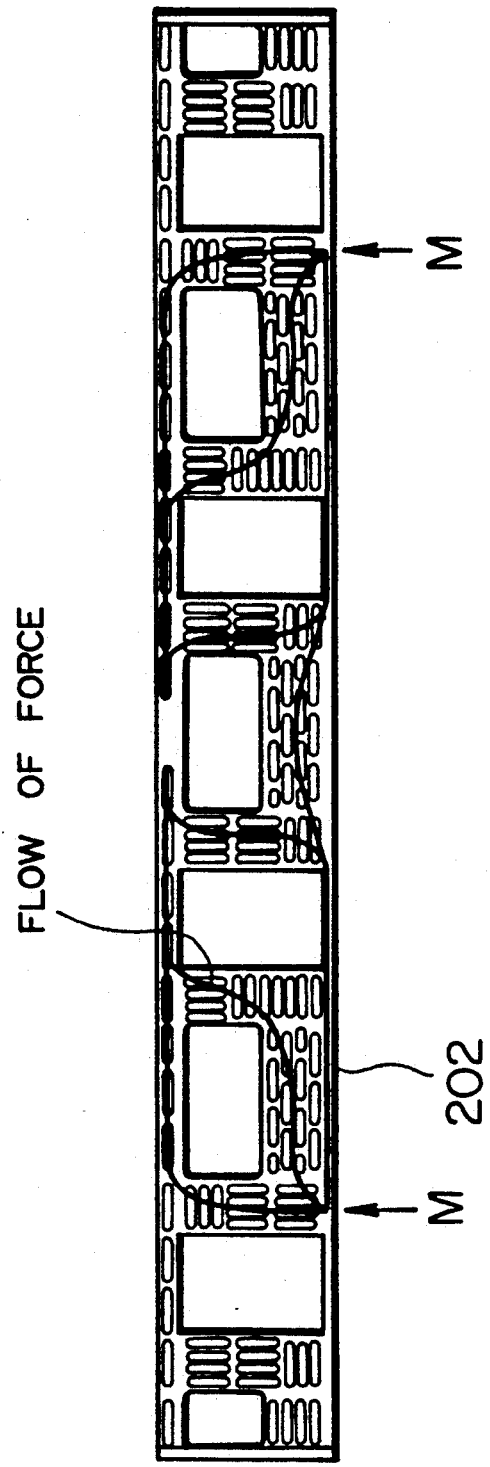

FIG.14A
PRIOR ART
FIG.14B
PRIOR ART
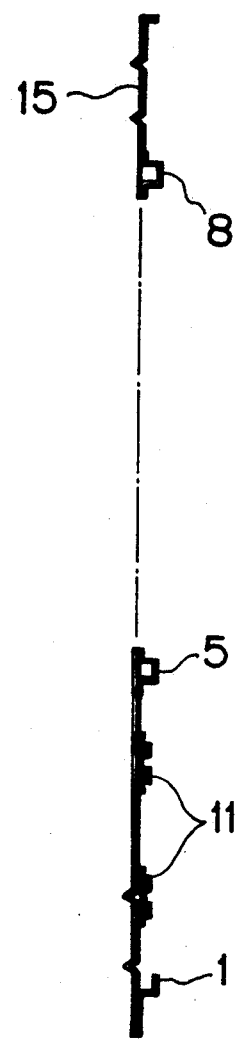
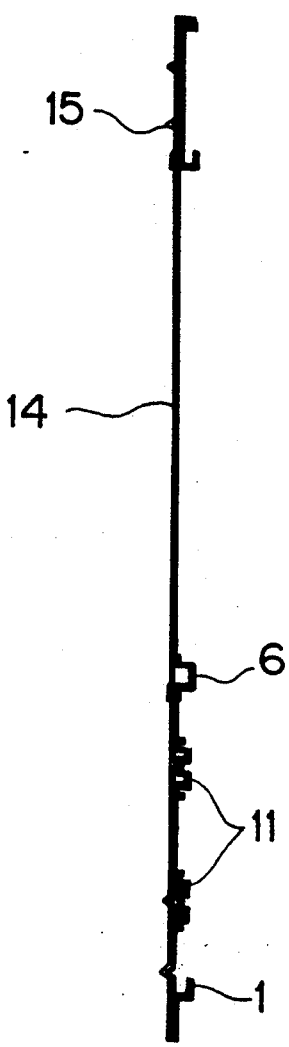
FIG.14C
PRIOR ART
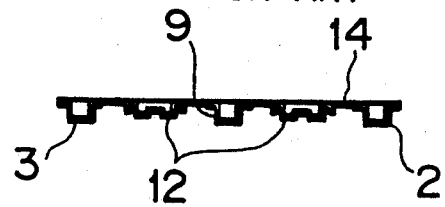

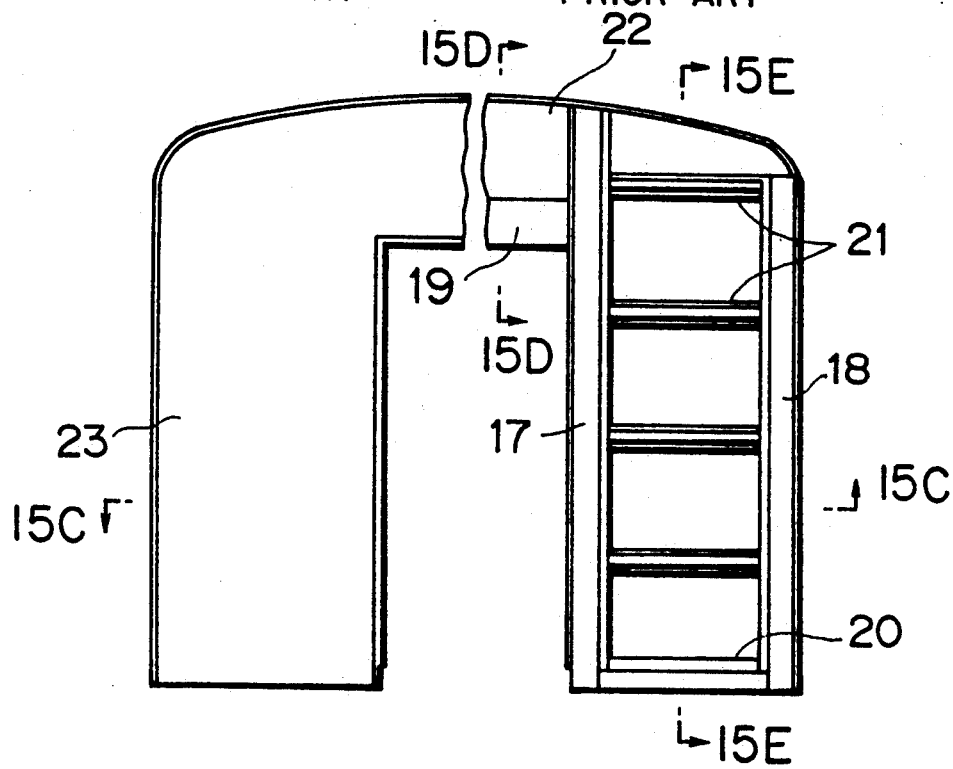

FIG.15D
PRIOR ART
FIG.15E
PRIOR ART
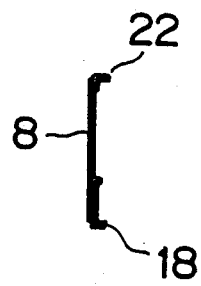
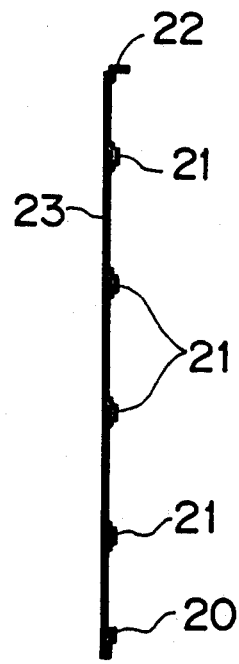

BODY STRUCTURE FOR RAILWAY VEHICLE

BACKGROUND OF THE INVENTION

1. Field of the Invention

The present invention relates to the body structure of railway vehicles and enclosed girder bridges, constructed of press-formed frameworks.

2. Description of the Prior Art

FIGS. 13A-14C show a side body structure for conventional vehicles. As shown in the figures, various posts such as a side entrance post 2, door end post 3, and side post 4 are vertically mounted relative to a horizontally laid rocker rail 1. Horizontally disposed between these posts are window sill 5, a door pocket window sill 6, a frieze 7, and a door header 8. Further, a door pocket post 9 and a frieze frame 10 are vertically provided relative to the aforementioned horizontally disposed members. The above mentioned members are welded together to complete the framework of a side body structure. Substantially the entire surface of the thus made framework is then covered with an outer plate sill 13, a door pocket window outer plate sill 14, and a frieze outer plate 15, to which are welded reinforcements 11 and 12. In this manner, a side body structure having a window 16 is completed.

FIGS. 15A-15E show an example of an end body structure provided at the front and rear bridges of a railway vehicle. The end body structure has a pair of end entrance posts 17 and 17 on the left and right sides of the end entrance, and vertically provided corner post 18 and 18. Between those posts are disposed a plurality of members such as a door header 19, an end rocker rail 20, and cross beams 21. An arch shaped beam 22 is disposed on the posts 17 and 18 and an end outer plate 23 is welded on the end body structure. In this manner, the end body structure is completed.

Japanese Patent Preliminary Publication No. 61-220962 discloses a structure in which a flat side outer plate and a reinforcement having an uneven surface are put together to form a side body structure. The reinforcing plates have relatively small projections transversely thereof, that is, beads, the cross section of which is that of triangle, and projections having a U-shaped cross section longitudinally of the small projections. The reinforcing plate may have an uneven surface with rectangular projections thereon and a core material is interposed between the side outer plate and the reinforcement.

Japanese Patent Preliminary Publication No. 61-220963 discloses a structure in which a bead is formed on pier panels between the side posts and cross members in the direction of a shear force.

Such conventional structures have drawbacks in that the side body structure requires a large number of components of different kinds, more preliminary preparation operations when machining, and complex working operations. The conventional structures also require a large number of jigs for positioning the respective members relative to each other, and is complex in getting all necessary parts ready for the assembly operation. In addition, welding must be carried out at many positions, such leading to increased mechanical strains and less dimensional precision.

According to the aforementioned Japanese Patent Preliminary Publications, No. 61-220962 and 61-220963, beads are used to form uneven surfaces. However, the projections provided by the beads are rather small, thereby being less effective. Japanese Preliminary Publication No. 61-220962 requires an additional operation of inserting the core material between the projections and the outer plate.

OBJECTS OF THE INVENTION

The present invention was made in view of the aforementioned drawbacks and an object of the present invention is to provide a side body structure of a vehicle which requires less number of parts, simplified part-machining and assembly operations, and insures required rigidity, lighter weight, and less dimensional distortion.

SUMMARY OF THE INVENTION

A side body structure for vehicles according to the invention is formed of a plurality of sections. Each of the sections has a reinforcement which is part of an integrally continuous construction. The reinforcement has a plurality of through holes which reduce the total weight of the reinforcement. The reinforcement further includes a plurality of ribs formed around the holes and is securely mated with and covered by a surface of an outer plate.

BRIEF DESCRIPTION OF THE DRAWINGS

Various other objects, features, and attendant advantages of the invention will become more apparent from the description of the preferred embodiments with reference to the following accompanying drawings in which like reference characters designate like or corresponding parts throughout the several views, and wherein:

FIGS. 3A—3E show an end body structure as a second embodiment of the invention, FIG. 3A being a rear view of the end body structure as seen from the passenger space, FIG. 3B being a front view of the end body structure of FIG. 3A as seen from the outside of the vehicle, FIG. 3C being a cross-sectional views taken along the line 3C—3C of FIGS. 3A and 3B, FIG. 3D being a cross-sectional view taken along the line 3D—3D of FIG. 3A, and FIG. 3E being a cross-sectional view taken along the line 3E—3E of FIG. 3A;

FIGS. 4A and 4B show a third embodiment of the present invention, FIG. 4A being a side view of the third embodiment as seen from the passenger space, and FIG. 4B being a side view of the third embodiment as seen from the outside of the vehicle;

FIGS. 12A-12C show a sixth embodiment of the present invention, FIG. 12A showing the direction of forces acting on the wainscot, FIG. 12B being a fragmentary expanded view of the wainscot having holes aligned in parallel, and FIG. 12C being a fragmentary expanded view of the wainscot wherein the holes are aligned in a zigzag fashion;

FIG. 14A is a cross-sectional view taken along the line 14A—14A of FIG. 13B, FIG. 14B is a cross-sectional view taken along the line 14A-14B of FIG. 13B, and FIG. 14C is a cross-sectional view taken along the line 14C—14C of FIG. 13A; and FIGS. 15A-15E show a conventional end body structure, FIG. 15A being a rear view of the end body structure as seen from the passenger space, FIG. 15B is being a front view of the end body structure of FIG. 15A as seen from the outside of the vehicle, FIG. 15C being a cross-sectional view taken along the lines 15C—15C of FIGS. 15A and 15B, FIG. 15D being a cross-sectional view taken along the line 15D—15D of FIG. 15A, and FIG. 15E being a cross-sectional view taken along the line 15E—15E of FIG. 15A.

DETAILED DESCRIPTION OF THE PREFERRED EMBODIMENT

First Embodiment

Figure 1A:
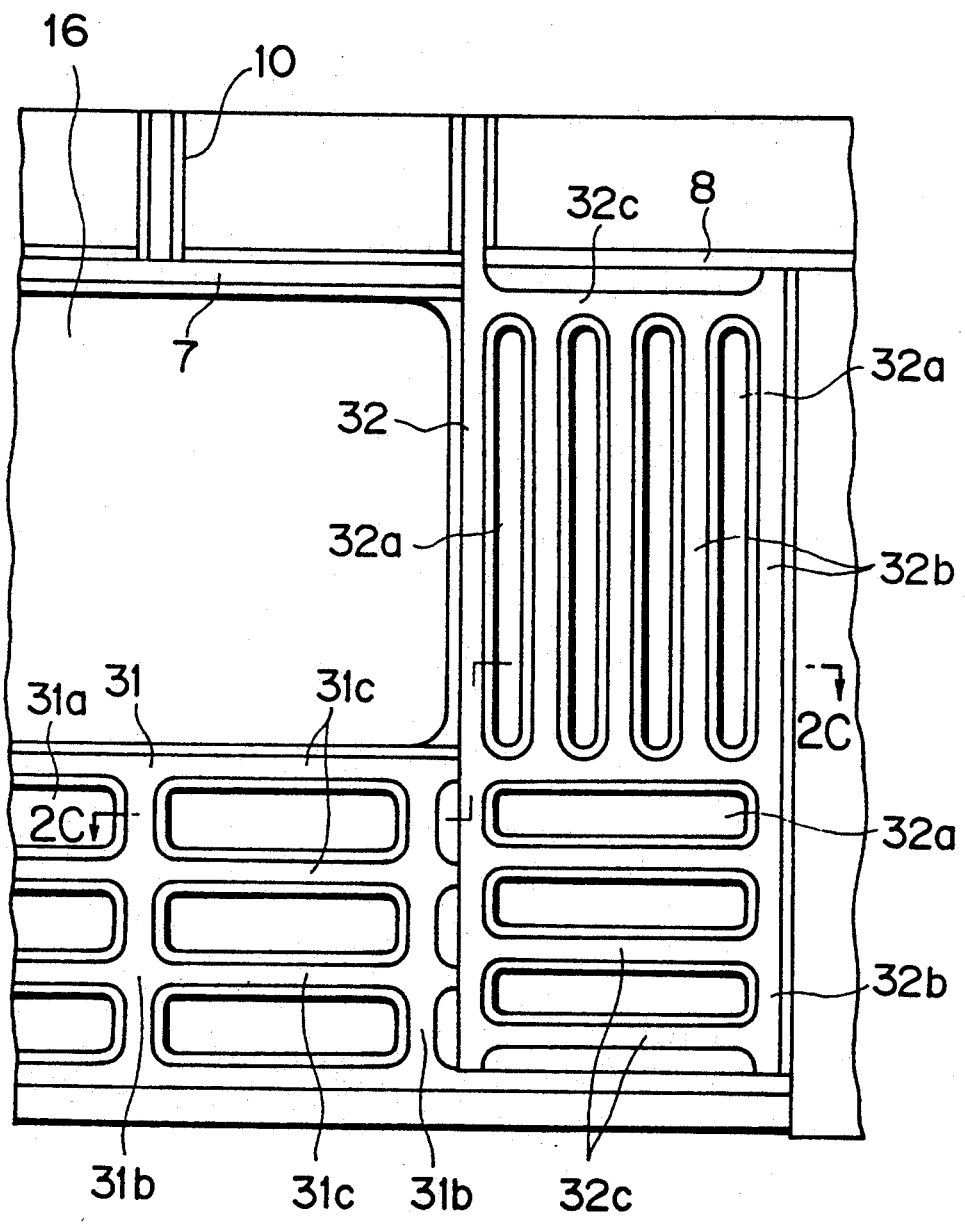
FIGS. 1A-1B a first embodiment of a side body structure for a vehicle according to the present invention, FIG. 1A being a side view of the body structure as seen from the passenger space of a vehicle, and FIG. 1B being a side view of the body as seen from the outside of the vehicle.
Figure 1B:
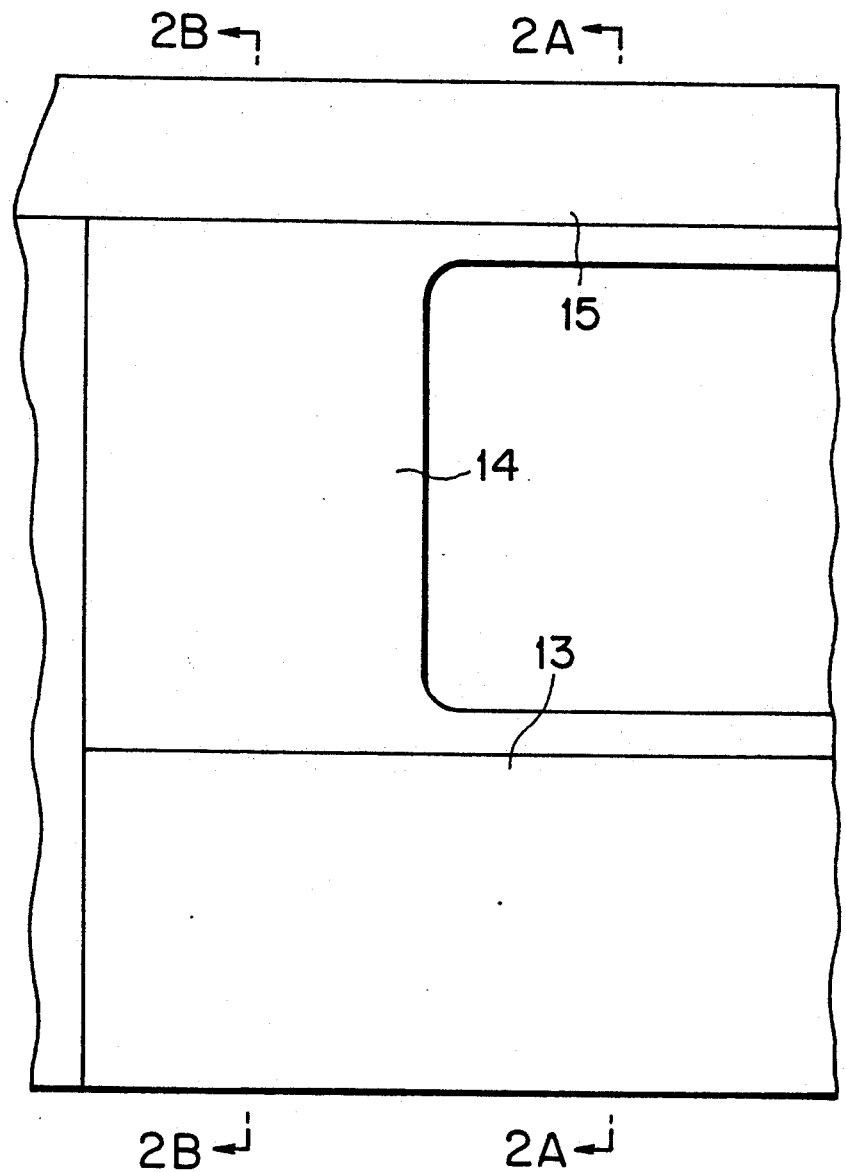
Figures 2A, 2B:
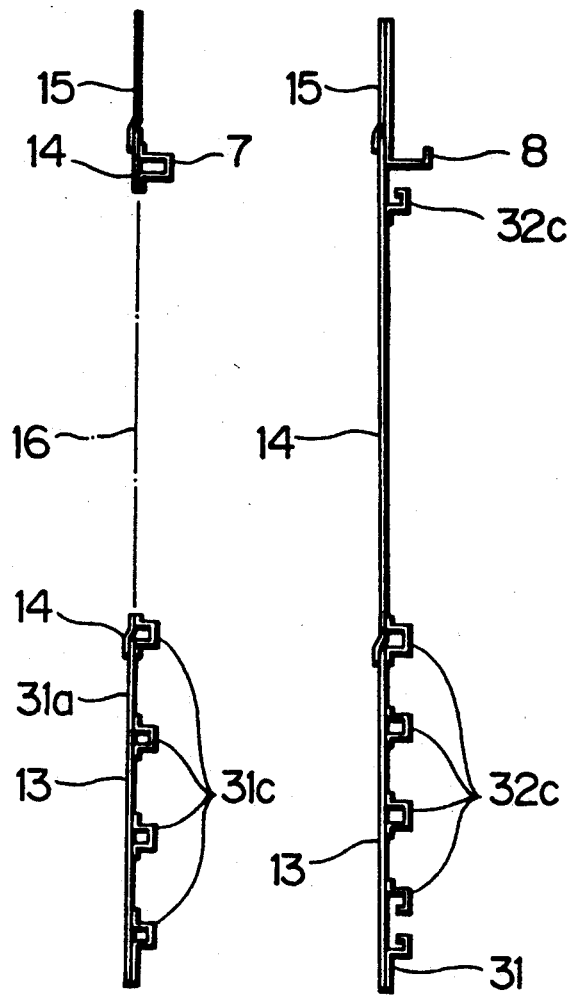
FIG. 2A is a cross-sectional view taken along the lines 2A—2A of FIG. 1B.
FIG. 2B is a cross-sectional view taken along the lines 2B—2B of FIG. 1B.
Figure 2C:
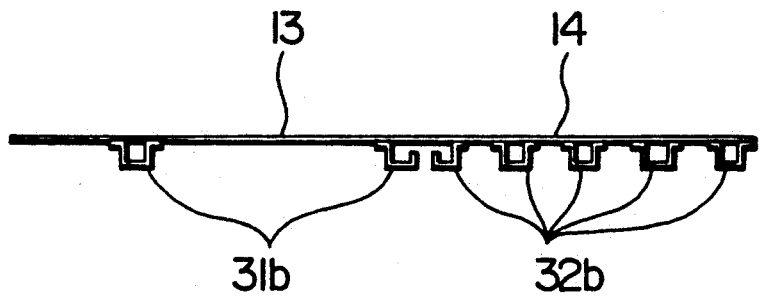
FIG. 2C is a cross-sectional view taken along the lines 2C—2C of FIG. 1A.
Figure 3D:
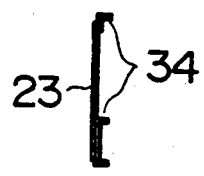
Figure 3E:
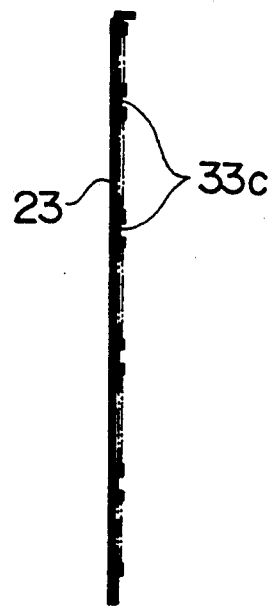

A first embodiment of the invention will now be described in detail with reference to the drawings.

FIGS. 1A-2C show a side body structure according to the invention. A side body structure of a vehicle is constructed of a plurality of sections. The rocker rail 1, a side post 4, a window sill 5, and reinforcement 11 of the prior art structure are formed of metal into a wainscot frame 31 as a sectionalized integrally continuous construction or structural member. A plurality of holes 31a are made in the section so as to reduce the overall weight of the structure. Around the holes are formed longitudinal ribs 31b which are in place of the conventional door end posts 3 and side posts 4, and transverse ribs 31c which are in place of the conventional window sill 5 and reinforcement 11.

Likewise, the side entrance post 2, door end post 3, door pocket post 9, reinforcements 11 and 12 and door pockets window sill 6 of the prior art structure are formed of metal into a door pocket frame 32 as a sectionalized integrally continuous or structural member. The door pocket frame 32 is formed with longitudinally elongated holes and transversely elongated holes therein around which longitudinally extending ribs 32b land transversely extending ribs 32c are formed, respectively. Above the respective sections 31 and 32 are formed a frieze 7, a door header 8, and a frieze frame 10 connected together so as to form a framework of a side body structure just as in the conventional side body structure. Then, a sill outer plate 13, a door pocket outer plate 14, and a frieze outer plate 15, which are similar to those of the conventional side body structure, are mounted on the respective sections. The outer plates 13, 14, and 15 may also be formed as a one piece structure. The respective sections 31 and 32 are connected together by, for example, welding before the outer plates 13, 14, and 15 are mounted so as to complete a side body structure primarily used for vehicles.

Second Embodiment

FIGS. 3A-3E show an end body structure as a second embodiment of a side body structure of the invention.

The end entrance post 17, corner post 18, end rocker rail 20, cross beams 21, and one end of arch shaped beam 22 of the prior art are formed through a pressing operation into an end wall frame 33 having an integrally continuous construction. Two end wall frames 33 are connected together with an end entrance upper frame 34 interposed therebetween. Each end wall frame 33 is also formed with through holes 33a therein just as other sections are formed with holes therein. Around the holes 33a are formed vertically extending ribs 33b and horizontally extending ribs 33c. Likewise, the end entrance upper frame 34 is formed with a through hole 34a and a rib 34b. Mounting an end outer plate 23 on the assembly of two end wall frames 33 and the entrance upper frame 34 completes the end body structure.

Third Embodiment

Figure 4B:
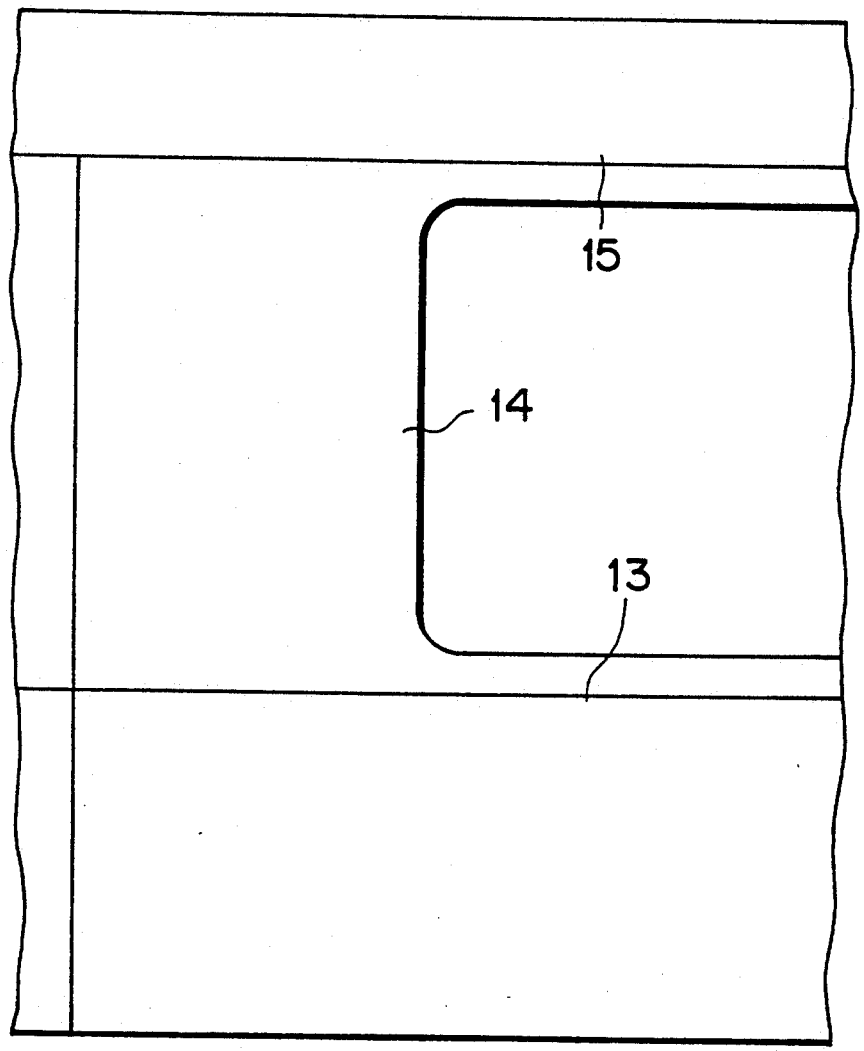

The arrangement of ribs of the invention are not limited to the longitudinal and transverse directions. FIGS. 4A and 4B show a third embodiment, where the wainscot frame 31 and door pocket frame 32 are provided with ribs 31d, 31e, 32d, and 32e that operate as diagonal beams. These ribs increase the rigidity of the vehicle in the back and forth direction of the vehicle. The ribs 31d and 31e may be combined with the longitudinal and transverse ribs 31b and 31c in FIG. 1A. The ribs may also be arranged such that their longitudinal axes cross each other regardless of whether the ribs are actually crossing each other.

Fourth Embodiment

Figure 5:
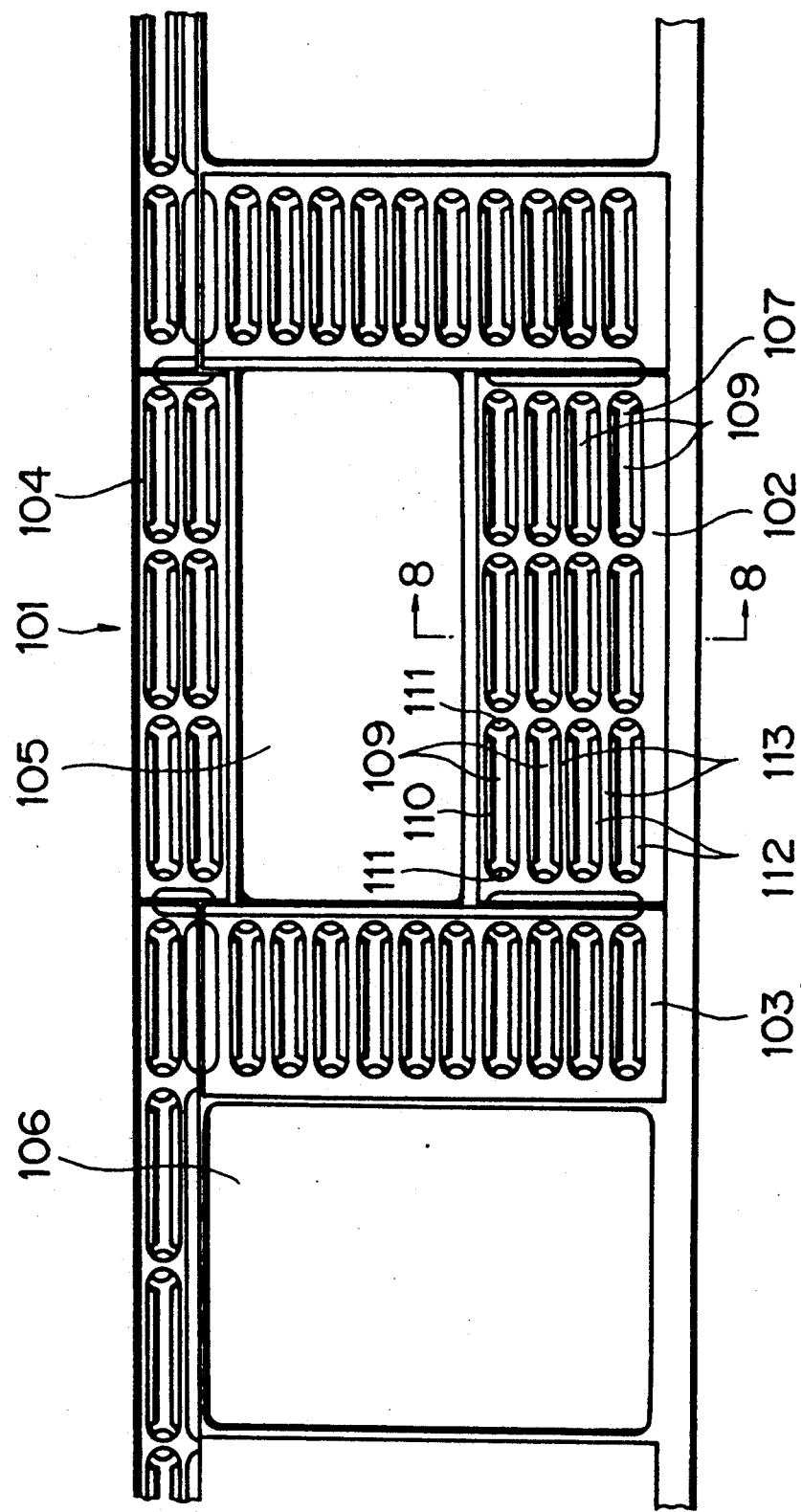
FIG. 5 is a rear view of a fourth embodiment of the present invention as seen from the passenger space.

FIG. 5 is a simplified rear view of a fourth embodiment of the present invention seen from a passenger space. A side body structure 101 is formed of a sill plate 102, a door pocket plate 103, and a frieze plate 104. The side body structure 101 has a side window 105 and side entrance 106.

Figure 6:
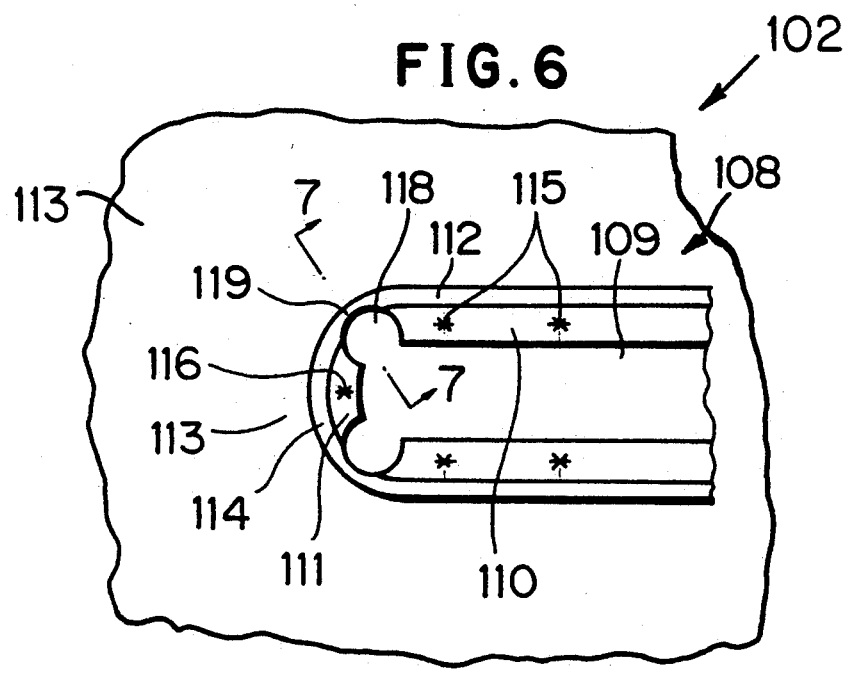
FIG. 6 is a fragmentary rear view, expanded in part, of the sill plate 102 of FIG. 5.
Figure 8:
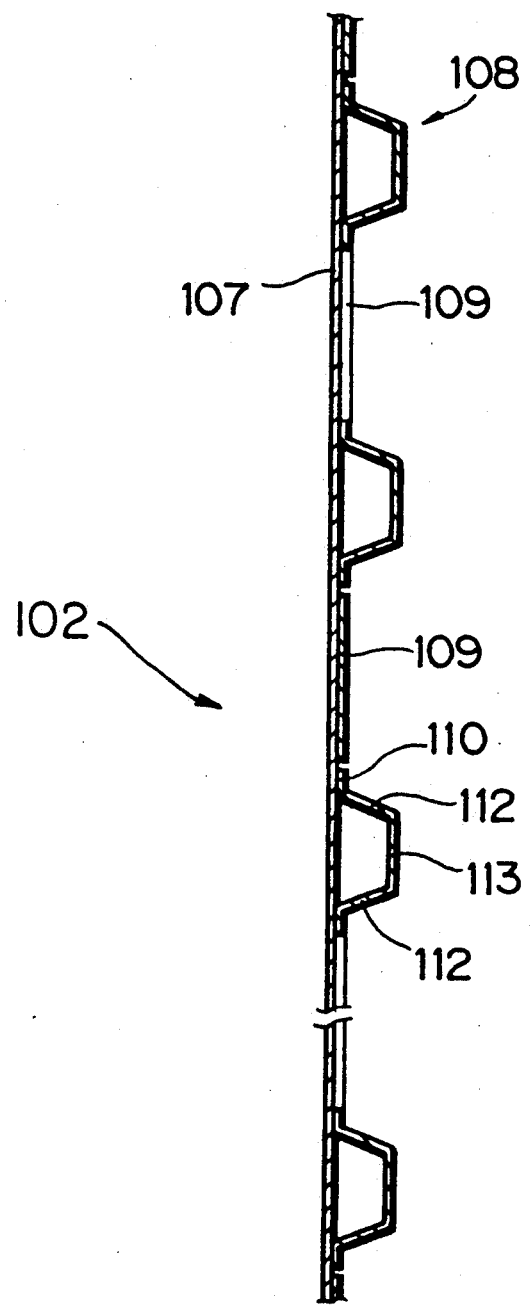
FIG. 8 is a cross-sectional view taken along the line 8—8 FIG. 5.

FIG. 6 is a fragmentary rear view of the sill plate 102 expanded in part. FIG. 8 is a cross-sectional view of the sill plate 102 taken along the line 8—8 of FIG. 5. A reinforcement 108 is formed with a plurality of elongated holes 109 therein and is secured to the surface on the side of the passenger space (right hand side of FIG. 8) of outer plate 107. The outer plate 107 and the reinforcement 108 are made of metal such as stainless steel.

Flanges 110 and 111 are formed around the hole 109 and are secured at 115 and 116 to the passenger side surface of the outer plate 107 through, for example, spot welding. The reinforcement 108 has a beveled portion 112 integrally continuous with the flanges 110 and with a reinforcing portion 113 between two beveled portions. Similarly, flange 111 is integrally continuous with the reinforcing portion 113 via beveled portions 114.

Figure 7:
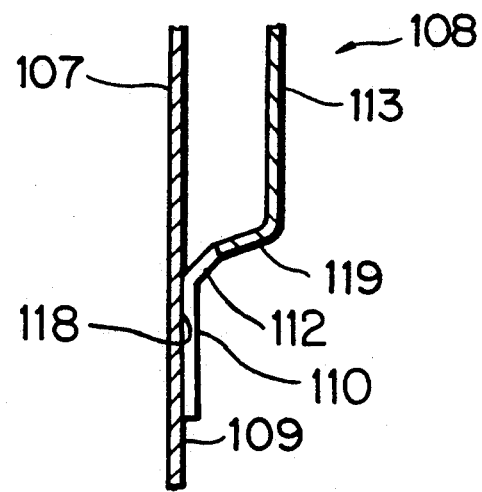
FIG. 7 is a simplified cross-sectional view taken along the line 7—7 of FIG. 6.
Figure 9:
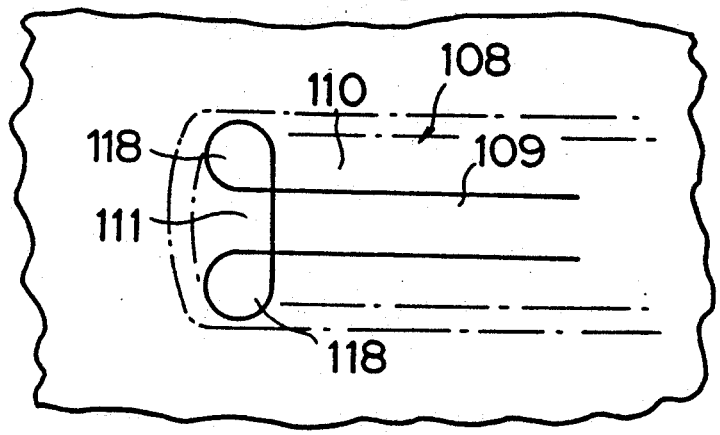
FIG. 9 is a front view of part of a plate-like material before it is plastically deformed.

FIG. 7 is a cross-sectional view taken along the lines 7—7 of FIG. 6. Arcuate cutouts 118 continuous with the hole 109 are formed at the corners of substantially rectangular hole 109 in the proximity of the beveled portions 112 and 114 and flanges 110 and 111, so that inwardly curved beveled portions 119 are formed when a flat sheet of metal comprising reinforcement 108 in FIG. 9 is press-worked. FIG. 9 shows the flat shaped reinforcement 108 before it is subjected to plastic deformation into the reinforcement shown in FIG. 8.

It should be noted that the hole 109 and the cutouts 118 are formed near the flanges 110 and 111.

The flanges 110 and 111 and beveled portions 112 and 114 are bent by pressing while the beveled portion 119 near each cutout 118 is formed by drawing. The cutouts 118 are provided so as to prevent wrinkles or cracks due to tensile forces acting thereon when the reinforcement is drawn. If the reinforcement has good malleability, then the cutouts 118 are not required.

Figure 10:
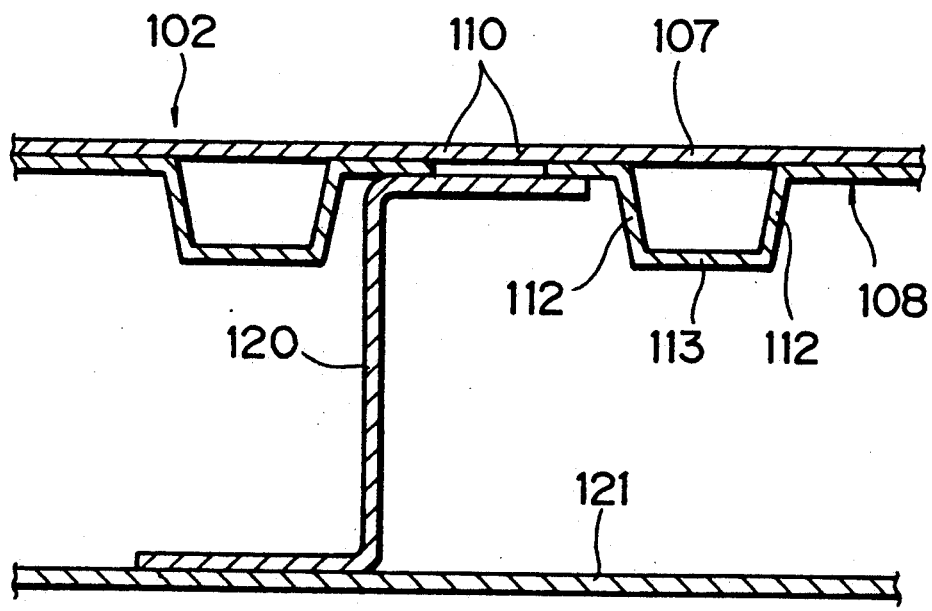
FIG. 10 is a horizontal cross-sectional view of the fourth embodiment showing the sill 102 secured to a post 120.

FIG. 10 is a horizontal cross-sectional view of the sill plate 102 and the vicinity thereof.

The sill plate 102 is spot-welded at the flange 110 of reinforcement 108 to a post 120. Then an interior plate 121 is, for example, bolted to the post 120 to define the passenger space.

Fifth Embodiment

Figure 11:
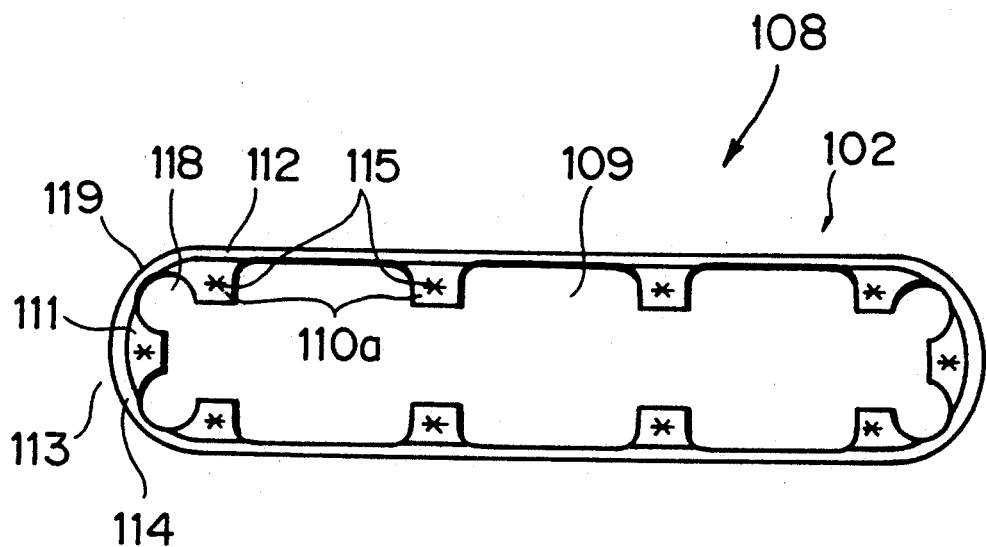
FIG. 11 is an expanded rear view of part of a fifth embodiment of the invention.

FIG. 11 is an expanded front view of a fifth embodiment of the present invention. A flange 110a is formed only at a portion where the reinforcement 108 is spot-welded to the outer plate 107. The fifth embodiment is advantageous in reducing total weight and costs of material. The outer plate 107 may be made not only of metal such as a sheet of stainless steel but also of other materials such as synthetic resin and FRP (fiber reinforced plastics). The outer plate and the flanges of the reinforcement may be connected together by, for example, spot welding, riveting, adhesives, and a fastener such as a bolt and nut.

Sixth Embodiment

Figure 12B:
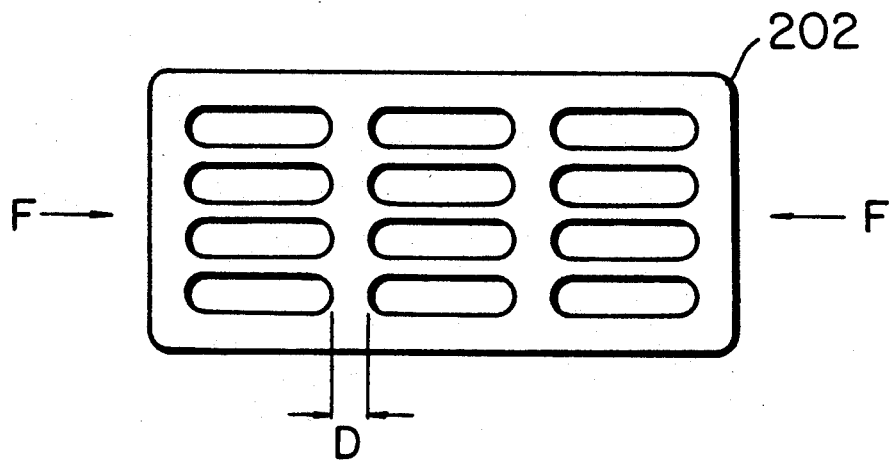
Figure 12C:
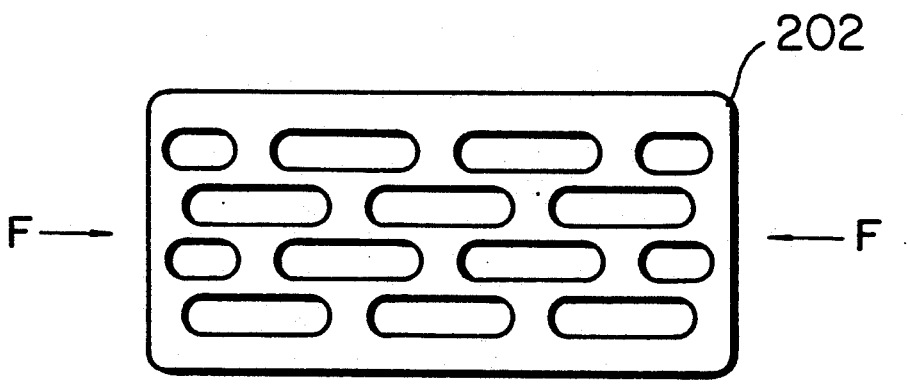
Figure 13A:
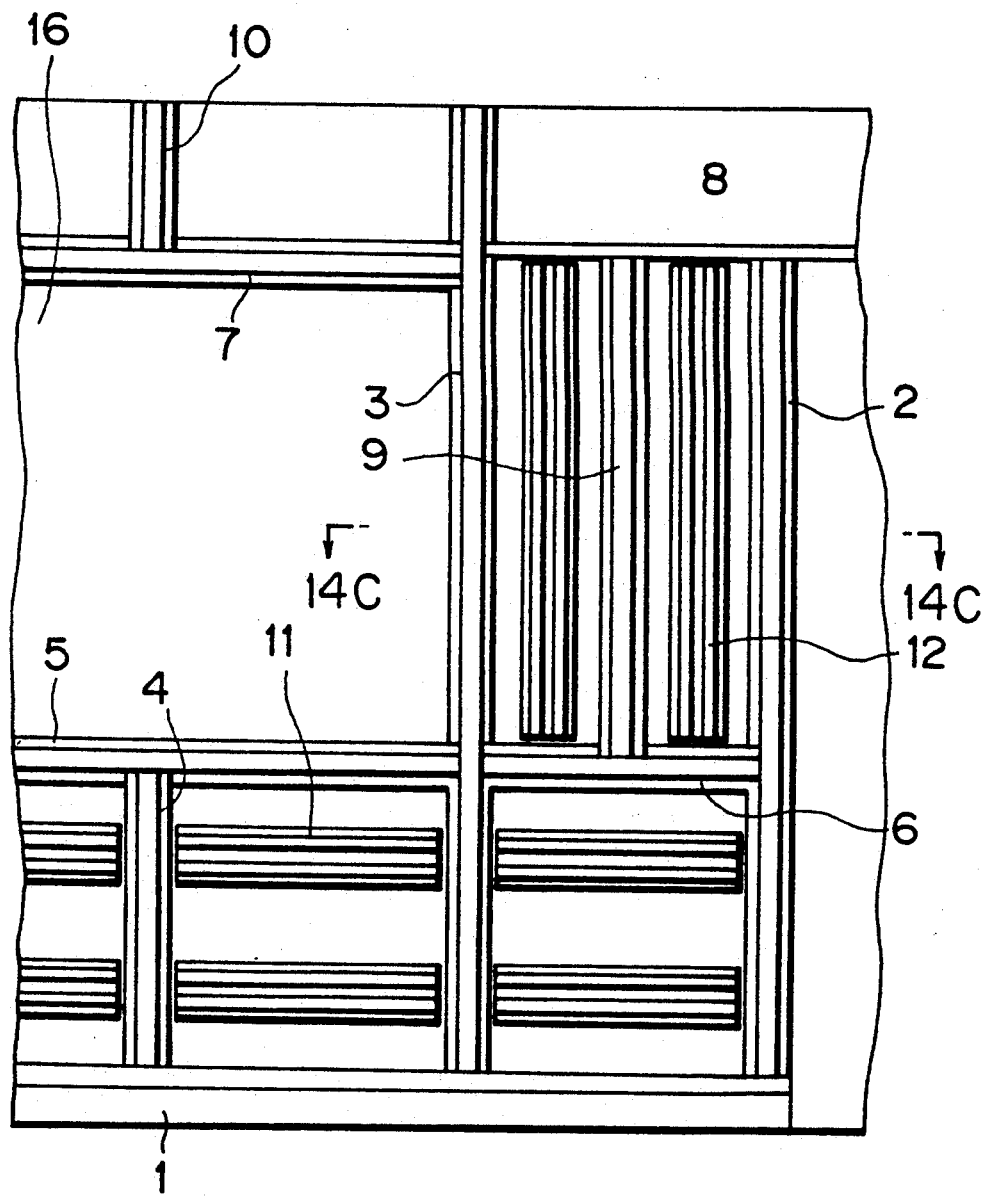
FIGS. 13A and 13B show a conventional side body structure, FIG. 13A being a rear view of the body structure as seen from the passenger space, and FIG. 13B being a front view of the body structure of FIG. 13A as seen from the outside of the vehicle.
Figure 13B:
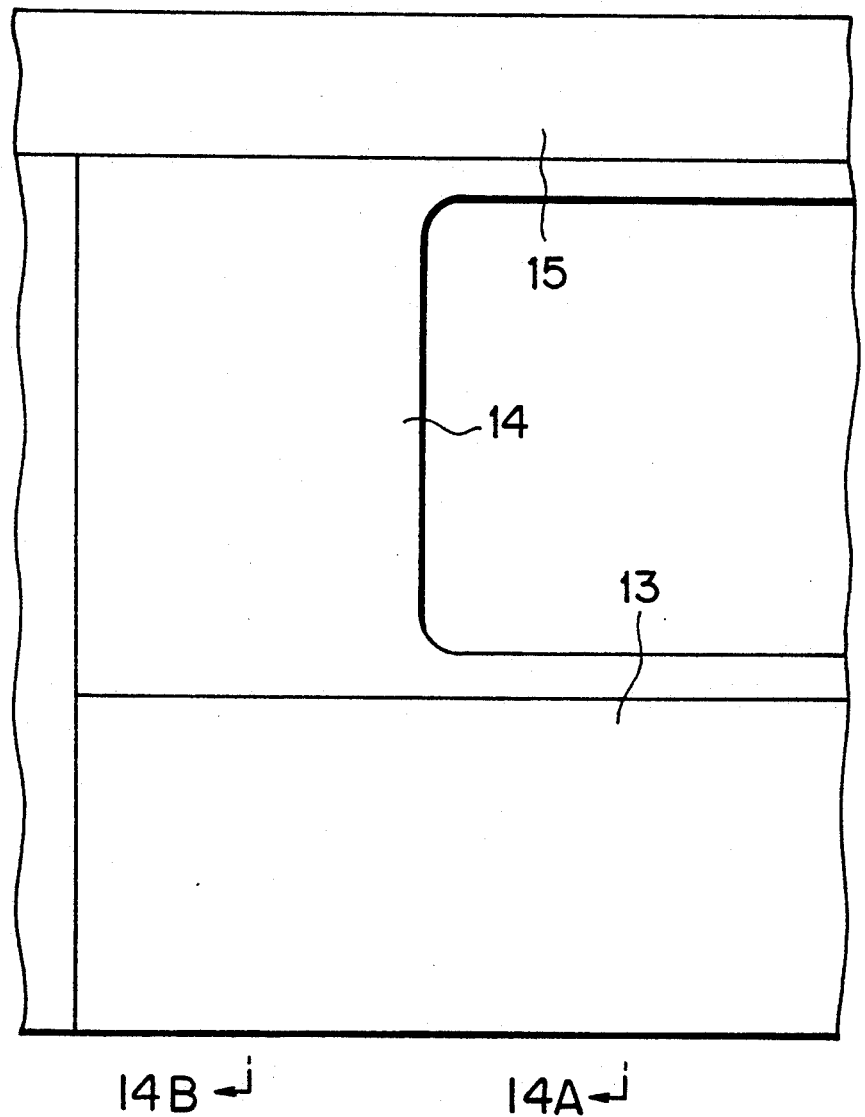

FIGS. 12A-12C show a sixth embodiment of the invention. FIG. 12A shows the directions of forces exerted upon the wainscot 202 when the vehicle body is supported on the bogies at arrows M, FIG. 12B is a view, expanded in part, of the wainscot having elongated holes aligned in parallel with each other, and FIG. 12C is a view, expanded in part, of the wainscot having elongated holes disposed in a zigzag arrangement.

If the wainscot 202 has elongated holes aligned in the direction of the applied forces, then the wainscot 202 may buckle at "D" when compressive forces are applied in the direction of arrows F. The buckling of the wainscot 202 as well as the outer plate placed together with the wainscot may be prevented by arranging the elongated holes in a zigzag fashion with the holes elongated in the direction of the applied forces. In this manner, the mechanical strength of the side body structure is enhanced.

INDUSTRIAL APPLICABILITY

Each section of the side body structure may be formed as an integrally continuous or structural member by the use of a press, which has a relatively high degree of freedom in making a variety of shapes for a structure. The integrally continuous construction of the respective sections reduces the number of parts and time required for assembling the sections, thereby improving productivity. Ribs may be formed in a variety of shapes and diagonal beams may be formed, if necessary, for more rigidity of the section.

The lighter weight of the side body structure is implemented by pressing a light, thin plate through which holes are punched. Further, preprocessed portions of the respective sections may easily be formed in proper shapes before the sections are finally connected together.

The frame of the side body structure is constructed of large size sections which allows least strain, least dimensional error, an ease of the manufacture of side body structure. In addition, the thus completed vehicle body will have lighter weight, sufficient rigidity against loads exerted, and good appearance.

Providing ribs improves the modulus of the section and the second moment of area, so that rigidity against out-plane bending and in-plane bending is increased.

The sill plate 102 withstands large axial forces in the longitudinal direction (leftwards and rightwards in FIGS. 5 and 6) of the hole 109, improving the buckling strength of the body structure. The reinforcement provided around the holes improves the rigidity of the respective sections against compression forces exerted at right angles with respect to the longitudinal length of the holes 109. Meanwhile, the portions without reinforcement are rather flexible preventing plastic deformation which may be caused by compressive forces.

The corner portions of the hole 109 have beveled portions 119 which have been rather rounded through drawing into a so-called three dimensional shape which withstands particularly a large torsional force exerted upon the entire section, so that crippling will not result.

The cutout 118 formed near the beveled portion 119 enables the flat sheet of metal as shown in FIG. 9 to be pressed with a relatively small force. Thus, there is no need for good malleability of the material.

A plurality of elongated holes are arranged in rows extending in the direction of exerted forces such that each elongated hole is positioned between two adjacent elongated holes in an adjacent row. This zigzag arrangement is particularly advantageous in increasing mechanical strength of the wainscot against bucking forces.

Obviously, many modifications and variations of the present invention are possible in light of the above teachings. It is therefore to be understood that within the scope of the appended claims, the present invention may be practiced otherwise than as specifically described herein.

What is claimed is:

1. A side body structure for a vehicle having a plurality of sections made of metal and connected together so as to form an entire body structure, each one of said sections comprising:
   a reinforcement formed as an integrally continuous construction;
   a plurality of holes formed within said reinforcement so as to reduce the weight thereof, each of said holes being substantially rectangular in configuration and having cutout portions at the four corners thereof;
   a plurality of ribs formed respectively around said holes by deforming a peripheral portion of each one of said holes, including said cutout portions; and
   an outer plate securely fastened to a surface of said reinforcement;

2. A vehicle body structure according to claim 1, wherein said plurality of reinforcements are spot-welded to said outer plates, respectively.

3. A vehicle body structure according to claim 1, wherein said ribs include ribs disposed in a row and ribs disposed in a column.

4. A vehicle body structure according to claim 1, wherein:
said ribs are formed by deforming a peripheral portion of each one of said holes through means of a drawing operation.

5. A vehicle body structure according to claim 1, wherein:
said ribs have flanges in contact with said outer plate when assembled and extending to define each one of said holes; and
a portion of said reinforcement is integrally continuous with said flanges and positioned away from said outer plate when said section is connected to said outer plate.

6. A side body structure as set forth in claim 1, wherein:
each one of said sections further comprises an interior plate for defining a passenger compartment, and a post is interposed between said reinforcement and said interior plate.

7. A side body structure as set forth in claim 1, wherein:
said ribs include flanges which are integrally continuous with said ribs, said flanges being in contact with said outer plate when assembled and extending around each one of said holes so as to define each one of said holes, said flanges also being provided with a plurality of cutout portions therein.

8. A side body structure for a vehicle having a plurality of sections connected together so as to form an entire body structure, each one of said sections comprising:
a reinforcement formed as an integrally continuous construction;
a plurality of holes formed within said reinforcement so as to reduce the weight thereof, said holes being elongated and disposed within rows extending in a direction of applied loads such that said holes are arranged in a zigzag mode wherein each hole disposed within a particular row is positioned between two adjacent holes disposed within an adjacent row;
a plurality of ribs formed respectively around said holes; and
an outer plate securely fastened to a surface of said reinforcement.

* * * * *